United States Patent

[11] 3,577,786

| [72] | Inventor | Albertus E. Schmidlin<br>Caldwell, N.J. |
|---|---|---|
| [21] | Appl. No. | 739,882 |
| [22] | Filed | June 25, 1968 |
| [45] | Patented | May 4, 1971 |
| [73] | Assignee | General Precision Systems, Inc.<br>Little Falls, N.J. |

[54] FLUERIC ACCELEROMETER
17 Claims, 6 Drawing Figs.

[52] U.S. Cl. .................................................. 73/515
[51] Int. Cl. .................................................. G01p 15/02
[50] Field of Search ........................................ 73/515,
516, 299; 137/251, 81.5

[56] References Cited
UNITED STATES PATENTS

| 1,821,958 | 9/1931 | Beecher ........................ | 73/299 |
| 3,131,565 | 5/1964 | Amlie ........................... | 73/516 |
| 3,354,725 | 11/1967 | Canfield ........................ | 73/516 |

Primary Examiner—James J. Gill
Attorneys—S. A. Giarratana, G. B. Oujevolk and S. M. Bender ABSTRACT: A flueric accelerometer comprising a chamber for a nonwetting liquid along with means to pass a pressurized gas through the liquid for detecting differences in hydrostatic pressure of the liquid in response to changes in acceleration of the chamber.

Patented May 4, 1971

INVENTOR
ALBERTUS E. SCHMIDLIN

BY S. A. Giavratana
ATTORNEY

Patented May 4, 1971

INVENTOR
ALBERTUS E. SCHMIDLIN
BY
S. A. Giovaratana
ATTORNEY

FLUERIC ACCELEROMETER

BACKGROUND OF THE INVENTION

This invention relates to a flueric accelerometer and, more particularly, to such an accelerometer which is adapted to be attached to a vehicle, or the like, for measuring acceleration of the vehicle.

Although many devices have been proposed for measuring acceleration, they generally consist of mechanical assemblies having moving parts, which are subject to wear and damage, and which are sensitive to nuclear reaction, extreme temperatures, and thermo and mechanical shocks, etc.

It is, therefore, an object of the present invention to provide an accelerometer which is fluid operated, which consists of no mechanical moving parts, and which eliminates the above disadvantages.

Briefly summarized, the flueric accelerometer of the present invention comprises a chamber having porous walls and containing a charge of a nonwetting liquid, such as liquid metal, or the like, along with means for passing pressurized gas into the chamber through the liquid. Since the hydrostatic pressure of the liquid will vary in response to changes in acceleration, the pressure of the gas will change accordingly and, therefore, provide a measure of acceleration.

BRIEF DESCRIPTION OF THE DRAWINGS

Reference is now made to the accompanying drawings for a better understanding of the nature and objects of the accelerometer of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
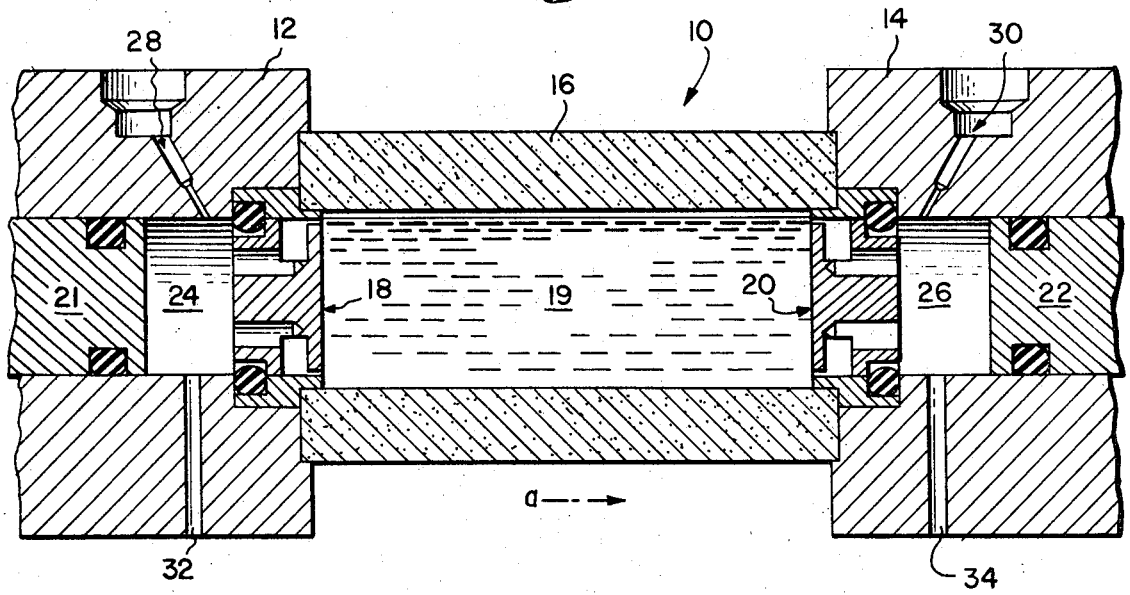
FIG. 1 is a cross-sectional view depicting one embodiment of the accelerometer of the present invention.

Referring specifically to FIG. 1 of the drawings, the reference numeral 10 refers to one embodiment of the accelerometer of the present invention, which generally consists of a pair of end blocks 12 and 14 disposed at each end of a porous cylinder 16. Two end walls 18 and 20 are also provided at the ends of the cylinder 16 to form a closed chamber 19.

A pair of plugs 21 and 22 are sealingly mounted in a bore formed in the end blocks 12 and 14, respectively, and are spaced from the end walls 18 and 20 to define a pair of plenums 24 and 26, respectively.

Inlet metering orifices 28 and 30, as well as outlet orifices 32 and 34, are provided in the end blocks 12 and 14, respectively. A charge of liquid, such as mercury, is disposed in the chamber 19, the volume of the liquid being slightly less than the volume of the chamber 19.

Figure 2:
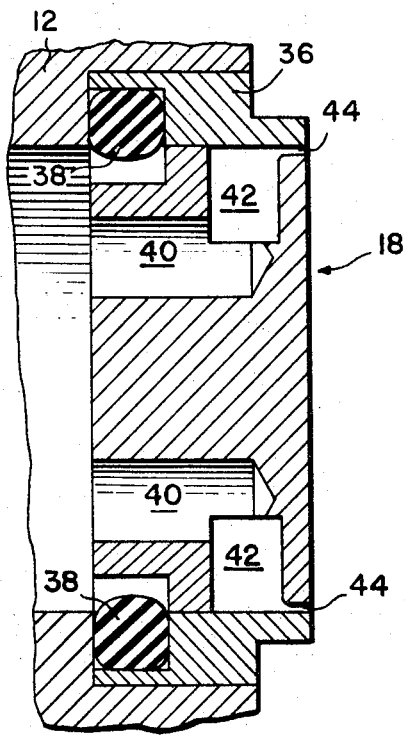
FIG. 2 is an enlarged partial view of FIG. 1.

The construction and arrangement of the end wall 18 is better shown with reference to FIG. 2, it being understood that the end wall 20 is similarly constructed and arranged. Specifically, the end wall 18 is pressed fitted to the inner wall of a ring 36 which, in turn, is disposed in a groove formed in the end block 12, and an O-ring 38 serves as a seal between the ring 36 and the end block 12.

A groove is provided in the ring 36 and in the end block 12 to receive one end of the cylinder 16 as shown in FIG. 1, the other end of the cylinder also being mounted in a similar manner. A pair of axial passages 40, in communication with the plenum 24, are provided in the end wall 18, which passages communicate with a peripheral passage 42 leading to an annular orifice 44 in communication with the chamber 19.

Figure 3:
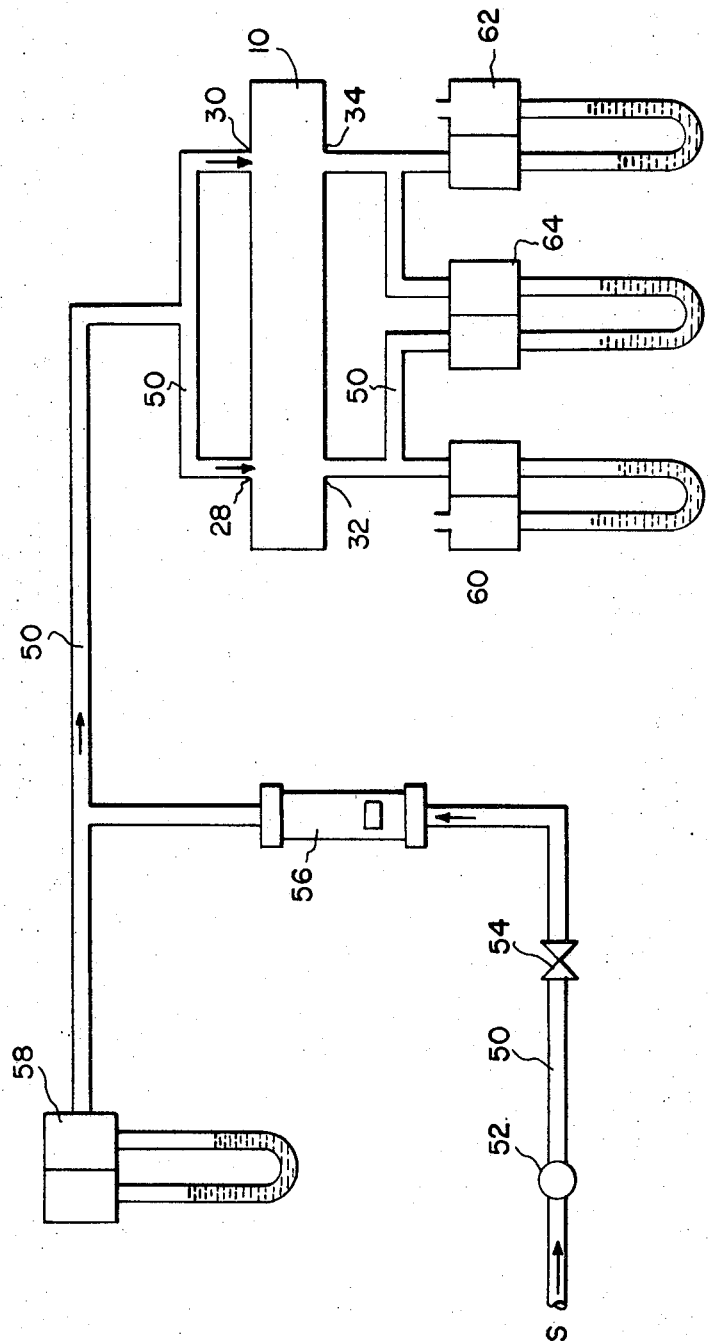
FIG. 3 is a diagrammatic view of the accelerometer of FIG. 1 in an operational environment.

Referring specifically to FIG. 3, which shows the accelerometer in an operating environment, a supply source S is adapted to introduce a gas, such as nitrogen, into the inlet orifices 28 and 30 through a conduit system 50 via a filter 52, a valve 54, and a rotometer 56, the pressure of the gas entering the inlet orifices 28 and 30 being measured by a pressure-sensing means, such as a manometer 58. A pair of manometers 60 and 62 are also provided which are in communication with the outlet orifices 32 and 34, respectively, and a differential manometer 64 is in communication with both of the latter orifices.

In operation, the accelerometer is placed in a position shown in FIGS. 1 and 3 with the longitudinal axis of the chamber 19 generally extending in the direction of acceleration which can be, for example, in the direction shown by the arrow $a$ in FIG. 1. A given acceleration in this direction will cause the hydrostatic pressure of the liquid adjacent the end wall 18 to increase in proportion to the acceleration, and the hydrostatic pressure of the liquid adjacent the end wall 20 to decrease in a similar manner.

Gas is passed through the various members shown in FIG. 3 to the inlet orifices 28 and 30, as shown by the arrows in FIG. 3, and through the latter at a constant mass flow into the plenums 24 and 26. This pressure is such that the gas will flow through passages 40 and 42, out the annular orifice 44 in each of the end walls 18 and 20, and into the liquid in the chamber 19, whereupon it passes through the liquid in the form of bubbles and exits out through the porous wall of the cylinder 16. The increased hydrostatic pressure at the entrance interface between the end wall 18 and the charge of liquid, and the decreased hydrostatic pressure at the entrance interface between the end wall 20 and the charge of liquid will cause a relative high pressure to build up in the plenum 24 and a relative low pressure to exist in the plenum 26.

The pressure of the gas in the plenum 24 will register on the manometer 60, as shown in fIG. 3, the pressure of the gas in the plenum 26 will register on the manometer 62, and a differential pressure will register on the manometer 64. Therefore, since this differential pressure is a function of the difference in local hydrostatic pressure of the mercury in the chamber 19, and this hydrostatic pressure in turn is directly proportional to the amount of acceleration, the manometer 64 can be calibrated to provide a direct measure of the linear acceleration. This is true, of course, only if there are no external forces acting on the system immediately prior to acceleration, resulting in the hydrostatic pressure being equal at the end walls of the cylinder. If this is not the case, then the differential manometer 64 may be calibrated accordingly.

The porous cylinder should be selected so that the liquid does not wet the partition and the size of the apertures in the porous cylinder 16 should be small enough with regard to the pressure differential across it so that the surface tension of the liquid prevents it from flowing through the apertures, while permitting the gas to do so. These requirements can be met, for example, by using mercury for the liquid and any wide variety of porous material for the cylinder 16, such as porous ceramics, sintered powdered metal compacts, and the like, Of course, the porosity of the material can be varied to provide the desired gas flow rate and to prevent the flow of liquid therethrough.

Figure 4:
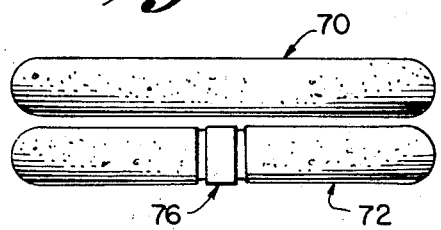
FIG. 4 is a front elevational view showing an alternate embodiment of the accelerometer of the present invention.
Figure 6:
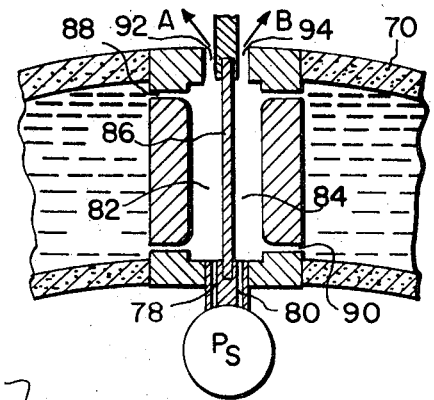
FIG. 6 is a partial enlarged sectional view of the accelerometer of FIGS. 4 and 5.
Figure 5:
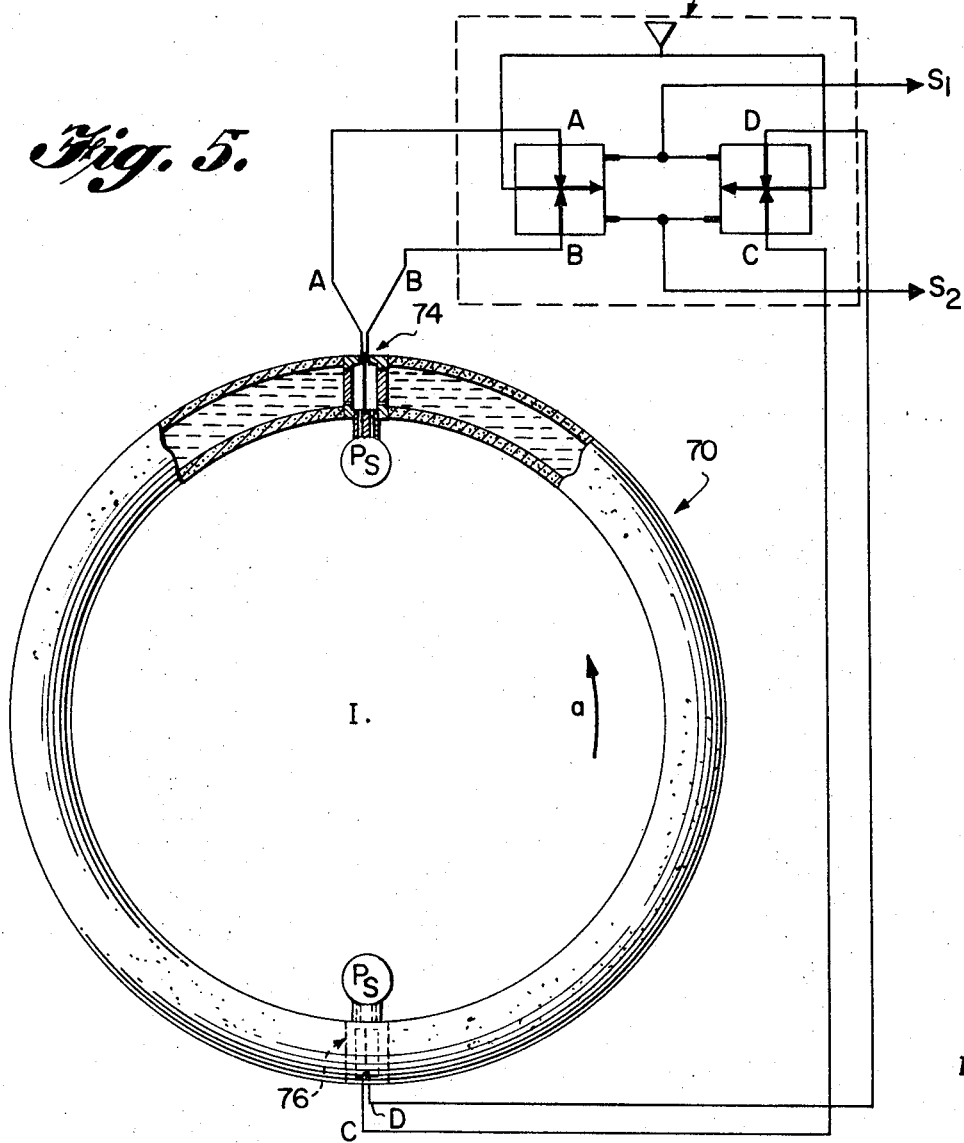
FIG. 5 is a top plan view showing the accelerometer of FIG. 4 and its connection with a summing amplifier.

FIGS. 4—6 refer to an alternate embodiment of the accelerometer of the present invention and, in particular, an accelerometer adapted to detect angular acceleration.

Specifically, the reference numerals 70 and 72 refer to a pair of toroidal vessels made of porous material which are disposed coaxially and adjacent to one another, as shown in FIG. 4. The porous material forming the vessels 70 and 72 may be of the same type as described in connection with the embodiments of FIGS. 1—3 above, and a charge of nonwetting liquid is placed in each of the vessels to fill them almost completely, leaving a small ullage space at its surface.

Partitions 74 and 76 are associated with each of the vessels 70 and 72, respectively, the details of the partition 74 of the vessel 70 being shown better in FIG. 6. In particular, the partition 74 has a pair of metering orifices 78 and 80 extending therethrough which are connected to a pressure source Ps, it being understood that this pressure source is also common to the partition 76 of vessel 72.

The metering orifices 78 and 80 register with a pair of gas pressure chambers 82 and 84 formed in the partition 74, which chambers are separated by a divider 86. Annular orifices 88 and 90 extend through the partition 74 to connect the chambers 82 and 84, respectively, with the interior of the vessel 70. A pair of output passages 92 and 94 also extend through the partition in communication with the chambers 82 and 84, respectively, which passages produce output pressure signals A and B, respectively.

As in the previous embodiment, the orifices 78 and 80 supply a constant mass flow through the orifices 88 and 90 into the chambers 82 and 84, respectively, to form gas bubbles at the inner surfaces of the partition, which bubbles pass through the charge of liquid in the vessel 70 and out the porous wall of the latter.

It is understood that the arrangement of the partition 76 of vessel 72 is identical to that of partition 74, and provides a pair of output pressure signals C and D.

A summing amplifier, shown generally at 96, is provided which is connected to the partitions 74 and 76, as shown, to read the output pressure signals, to sum the signals A and D and the signals B and C, and to provide amplified outputs $S_1$ and $S_2$, respectively.

In operation, angular acceleration of the accelerometer in the direction $a$, for example, about the input axis I, as shown in FIG. 5, creates a hydrostatic pressure gradient in the angular direction of acceleration which causes the hydrostatic pressure of the liquid in the vessel 70 to increase in the vicinity of the orifice 88 associated with the output pressure signal A, and the hydrostatic pressure of the liquid in the vessel 72 to increase in the vicinity of the orifice that produces the output pressure signal D. Signals A and D are summed and amplified by the amplifier 96, thereby producing an amplified output $S_1$ which is proportional to the angular acceleration.

Of course, if the accelerometer is subject to an angular acceleration in a direction opposite to $a$, the pressure signals B and C would be detected and summed as described above, to produce an amplified output $S_2$.

The purpose of the two vessel arrangement is to minimize cross coupling of the inputs due to linear acceleration of the device. Specifically, when the accelerometer of FIGS. 4—6 is subjected to a linear acceleration, the hydrostatic pressure gradients are such that the amplifier output remains unchanged. This occurs because of one of the following relationships among the pressure signals:

1. A=B and C=D, or
2. B=D and A=C

Hence, cross coupling of the linear inputs is prevented.

However, if this cross coupling is of no concern, it is understood, of course, that a single porous vessel may be utilized instead of the two vessel arrangement as shown.

It is thus seen that the accelerometers of the present invention provide a simple means of measuring linear and angular acceleration and comprise no moving parts, while providing a relatively high-power output signal.

Of course, other variations of the specific construction and arrangement of the accelerometers disclosed above can be made by those skilled in the art without departing from the invention as defined in the appended claims.

I claim:

1. An accelerometer, comprising a first wall and a second wall arranged to form a chamber having an axis for containing a first fluid, which substantially fills the chamber and the hydrostatic pressure gradient of which varies in said chamber in response to acceleration, at least one inlet orifice formed in said second wall of said chamber along said axis, passage means external of said chamber and communicating with said inlet orifice, means to introduce a second fluid into said passage means to cause flow of said second fluid through said inlet orifice and said first fluid and said chamber, outlet means formed in said first wall, said outlet means being operative to permit passage of said second fluid therethrough and to prevent passage of said first fluid therethrough from said chamber, and means for detecting the pressure of said second fluid in said passage means in response to changes in the component of said acceleration along said axis.

2. The accelerometer of claim 1 wherein said second fluid is of a lesser density than said first fluid, and wherein said outlet means includes a portion of the first wall of said chamber, said wall portion having a selected porosity to permit passage of said second fluid therethrough and to prevent passage of said first fluid therethrough.

3. The accelerometer of claim 1 wherein said detecting means comprises a pressure-sensing means connected to said passage means.

4. The accelerometer of claim 1 wherein said first fluid is a nonwetting liquid and said second fluid is a gas.

5. The accelerometer of claim 1 wherein said inlet orifice is annular.

6. The accelerometer of claim 1 wherein said chamber is of a substantially toroidal shape so that the accelerometer measures changes in angular acceleration.

7. An accelerometer, comprising a first wall and a second wall and a third wall arranged to form an elongated chamber having an axis for containing a first fluid, which substantially fills the chamber and the hydrostatic pressure gradient of which varies longitudinally in said chamber in response to acceleration, an inlet orifice formed in each end of said chamber including a first orifice formed in said second wall along said axis and a second orifice formed in said third wall along said axis, first and second passage means external of said chamber and communicating with said first and second inlet orifices, respectively, means to introduce a second fluid into said first and second passage means to cause flow of said second fluid through each of said inlet orifices and said first fluid and said chamber, outlet means formed in said first wall, said outlet means being operative to permit passage of said second fluid therethrough and to prevent passage of said first fluid therethrough from said chamber, and means for detecting the differential pressure of said second fluid in said first and second passage means in response to changes in the component of said acceleration along said axis.

8. The accelerometer of claim 7 wherein said second fluid is of a lesser density than said first fluid, and wherein said outlet means includes at least a portion of the first wall of said chamber, said wall portion having a selected porosity to permit passage of said second fluid therethrough and to prevent passage of said first fluid therethrough.

9. The accelerometer of claim 7 wherein said detecting means comprises a pressure-sensing means connected to each of said passage means.

10. The accelerometer of claim 7 wherein said first fluid is a nonwetting liquid and said second fluid is a gas.

11. The accelerometer of claim 7 wherein said inlet orifice is annular.

12. An accelerometer, comprising a first wall and a second wall and a third wall arranged to form at least one substantially toroidal chamber having an axis for containing a first fluid, which substantially fills the chamber and the hydrostatic pressure gradient of which varies in said chamber in response to angular acceleration, at least two inlet orifices formed in said chamber including a first orifice formed in said second wall along said axis and a second orifice formed in said third wall along said axis, passage means external of said chamber and communicating with said first and second inlet orifices, means to introduce a second fluid into said passage means to cause flow of said second fluid through said inlet orifices and said first fluid and said chamber, outlet means formed in said first wall, said outlet means being operative to permit passage of said second fluid therethrough and to prevent passage of said first fluid therethrough from said chamber, and means responsive to the pressures of said second fluid in said passage means to provide an output signal proportional to the component of angular acceleration along said axis.

13. The accelerometer of claim 12 wherein said second fluid is of a lesser density than said first fluid, and wherein said outlet means includes a portion of the first wall, said wall portion having a selected porosity to permit passage of said second fluid therethrough and to prevent passage of said first fluid therethrough.

14. The accelerometer of claim 12 wherein said means responsive to the pressures of said second fluid in said passage means comprises an amplifier operatively connected to said passage means.

15. The accelerometer of claim 12 wherein said first fluid is a nonwetting liquid and said second fluid is a gas.

16. The accelerometer of claim 12 wherein there are two chambers provided, the two inlet orifices of one chamber being diametrically opposite to those of the other chamber.

17. The accelerometer of claim 16 wherein said means responsive to the pressures of said second fluid in said passage means provides a summed output signal.

UNITED STATES PATENT OFFICE
CERTIFICATE OF CORRECTION

Patent No. 3,577,786   Dated May 4, 1971

Inventor(s) Albertus E. Schmidlin

It is certified that error appears in the above-identified patent and that said Letters Patent are hereby corrected as shown below:

Change Title Page item [73] ASSIGNEE from "General Precision Systems Incorporated"

to --Singer-General Precision, Inc.,--.

See Change of Name Recorded:   12/13/68
                               Reel:   2499
                               Frame:  407

Signed and sealed this 21st day of September 1971.

(SEAL)
Attest:

EDWARD M. FLETCHER, JR.        ROBERT GOTTSCHALK
Attesting Officer                 Acting Commissioner of Patents